April 28, 1953  G. W. OAKES  2,636,310
TRAP
Filed Nov. 16, 1951
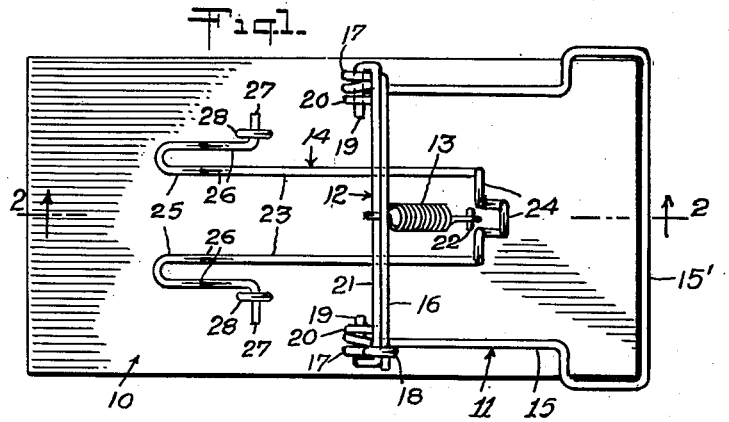
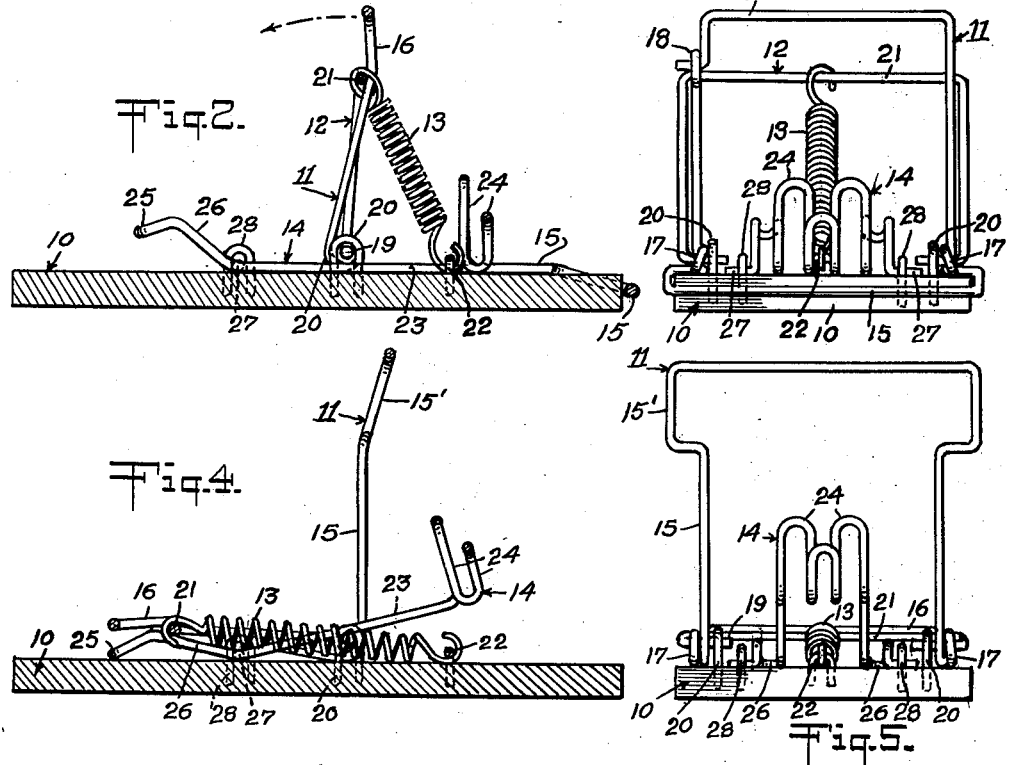
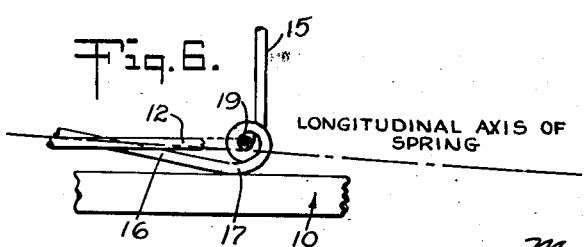
INVENTOR.
George W. Oakes
BY
Munn, Liddy & Nathanson
Attorneys Patented Apr. 28, 1953

2,636,310

UNITED STATES PATENT OFFICE 2,636,310

TRAP

George W. Oakes, Crystal City, Mo.

Application November 16, 1951, Serial No. 256,790

9 Claims. (Cl. 43—81)

This invention relates to a device for trapping small animals such as mice.

The present invention resides in the simplicity of the construction of a device of the indicated character, the economy with which it may be produced, and the utility and efficiency derived therefrom.

The nature of the invention and its distinguishing features and advantages will appear when the following specification is read in conjunction with the accompanying drawings, in which Fig. 1 is a top plan view of a trap embodying the features of the present invention, the trap being shown sprung.

Fig. 2 is a longitudinal sectional view taken on the line 2—2 of Fig. 1, the spring not being sectioned.

Fig. 3 is an end view of the trap showing it sprung.

Fig. 4 is a view similar to Fig. 2, but showing the trap set.

Fig. 5 is an end view of the trap showing it set.

Fig. 6 is a fragmentary detail view showing the relation of certain parts to the longitudinal axis of the spring when the trap is set.

The trap comprises a flat oblong base 10 on which are operatively arranged an L shape member 11, a bail or inverted U-shape member 12, a helical contractile spring 13, and a bait holding trigger 14.

The base 10 is made of wood, but it may be made of any other suitable material.

The L shape member 11 is made of a single piece of stout wire bent upon itself into a generally L-shape closed loop structure of which one leg constitutes a loop jaw 15, and the other leg constitutes a loop manipulator 16 joined to the jaw 15 by small coils constituting pintle eyes 17 in transverse axial alinement. The ends of the piece of wire are engaged with each other in any suitable manner as by a hook 18 formed out of one of said ends, and the hook being engaged with the other end.

U-shape member 12 is made of a single piece of stout wire, the side portions terminating in axially alined pintles 19.

Secured to the base 10 on top of the same are staples 20 or the like which provide transversely alined bearings which receive the pintles 19, thus connecting the U-shape member 12 for pivotal movement with respect to the base. The eyes 17 receive the pintles 19, and one side portion of the U-shape member is engaged with the hook 18, thus connecting the L-shape member 11 for pivotal movement together with the U-shape member 12 on the same transverse axis with respect to the base.

The jaw 15 has a widened outer end, as at 15', so as to cooperate with the corresponding front end edges of the base for gripping action therewith when the jaw is in the closed sprung position, as shown in Fig. 1. The manipulator 16 projects beyond the transverse portion 21 of the U-shape member 12 for convenient manipulation of both members 11 and 12 into a set position.

The spring 13 has one end thereof connected to the base 10 by a staple 22 or the like, and the other end of the spring is connected with the transverse portion 21 of the member 12. Spring 13 in stretched condition causes return movement of the members 11 and 12 to a sprung position.

The trigger 14 is made of a piece of stout wire bent into a structure providing legs 23 joined by upstanding loops 24 constituting bait holding means on one end of the trigger, and said legs 23 being crimped and thus providing the tail ends 25 of the trigger with rearwardly and upwardly inclined portions 26 and laterally disposed axially alined pintles 27. Staples 28 or the like on the base 10 provide bearings in transverse alinement behind the pivotal connection of the members 11 and 12 in spaced relation thereto. The staples 28 receive the pintles 27, thus connecting the trigger 14 for pivotal movement with respect to the base disposed longitudinaly thereof as shown.

The provision, construction and arrangement of the parts are such that when the members 11 and 12 are in the sprung position they may be moved into a set position while holding the base with one hand and using the thumb of the other hand to bear rearwardly and downwardly on the manipulator 16 until the transverse portion 21 of the member 12 contacts the portions 26 of the tail end of the trigger causing the extremities thereof to contact the base. The trigger will then be cocked and the center of pull of the stretched spring 13 will be slightly below the pivotal connection of the members 11 and 12. In this connection, it is to be understood that portions of the coils or eyes 17 are eccentric and function as cams to elevate the pintles 19 so that the axes thereof are slightly above the line of pull of the spring 13 when the trap is set. Thus the trap will be set in a manner requiring very little effort to hold or release the trigger.

When a mouse or other small animal nibbling on the bait exerts a slight downward pressure on the trigger it will rock past dead center, and as a result the spring 13 acting on the member 12 will cause both members 11 and 12 to snap into a closed sprung position in which the jaw 15 grippingly cooperates with the base 10. In this manner a mouse is trapped and killed.

By using the member 12, the member 11 is given additional strength and rigidity. It affords the pivots for the member 11. A shorter spring than one connected with the transverse portion of the manipulator 16 may be used, while the longer manipulator affords greater leverage and convenience in setting the trap.

It is to be understood that the invention includes all constructions and modifications coming within the scope of the appended claims.

I claim:

1. A trap comprising a base, a pivoted spring actuated jaw member which cooperates with said base, and a bait holding trigger pivoted on said base, the pivotal connection of the trigger being behind the pivotal connection of said jaw member, the trigger having a tail end which when engaged by a portion of said jaw member in the set position holds the trigger cocked subject to pressure on the bait end of the trigger causing the jaw member to be sprung into a closed gripping relation to the base.

2. A trap as set forth in claim 1, wherein the tail end of the trigger has a rearwardly and upwardly inclined portion engaged by said portion of the jaw member.

3. A trap comprising a base, a bait holding trigger pivoted on the base, a spring actuated U-shape member pivoted on the base, the pivotal connection of the U-shape member being in advance of the pivotal connection of the trigger, and a jaw member pivoted on the base coincidental with the bail shape member and connected with said U-shape member, said U-shape member being movable into a position to engage the tail end of the trigger to hold it cocked subject to pressure on the bait of the trigger causing the jaw member to be sprung into a closed gripping engagement with the base.

4. A trap comprising a base, an inverted spring actuated U-shape member pivoted on the base, an L-shape member pivoted on the base, the pivotal connection of the L-shape member being coincidental with the U-shape member, one leg of the L-shape member constituting a jaw which cooperates with the base, and the other leg of the L-shape member constituting a manipulator connected with the U-shape member to cause pivotal movement of both of said members into a set position, and a bait holding trigger pivoted on the base, the pivotal connection of the trigger being behind the pivotal connection of said members, the tail end of the trigger being engaged by the U-shape member to hold the trigger in a cocked position subject to pressure on the bait end of the trigger causing said U-shape member to move the L-shape member into a sprung position wherein the jaw grippingly cooperates with the base.

5. A trap as set forth in claim 4, wherein the tail end of the trigger has a rearwardly and upwardly inclined portion engaged by the U-shape member.

6. A trap comprising an oblong flat base, an inverted U-shape member made of stout wire, said U-shape member having a pair of legs the legs of said U-shape member having formed thereon alined pintles, means on the base engaged by the pintles whereby the U-shape member is connected with the base for pivotal movement, a contractile spring having its opposite ends connected with the base and U-shape member respectively, an L-shape member made of stout wire and provided with pintle eyes at the junctures of the legs thereof, said pintles being disposed in said eyes by which the L-shape member has pivotal movement, one leg of the L-shape member constituting a loop jaw which cooperates with the base and the other leg constituting a manipulator connected with the U-shape member to cause pivotal movement of both of said members into a set position, and a bait holding trigger pivoted on the base, the pivotal connection of said trigger being behind the pivotal connection of said members, the tail end of the trigger being engaged by the U-shape member to hold the trigger in a cocked position subject to pressure on the bait end of the trigger causing the U-shape member to move the L-shape member into a sprung position wherein the jaw grippingly cooperates with the base.

7. A trap as set forth in claim 6, wherein said trigger is made of stout wire and its tail end has a crimp engaged by the U-shape member.

8. A trap as set forth in claim 6, wherein said eyes have eccentric portions which raise the pintles above the center of pull of the spring when the L-shape member is being moved into the set position.

9. A trap comprising a base, an inverted U-shape member having a pair of legs, said legs having formed thereon alined pintles, means on the base engaged by said pintles whereby the U-shape member is connected with the base for pivotal movement, a contractile spring having its opposite ends connected with the base and the U-shape member respectively, an L-shape member having a pair of legs, pintle eyes formed at the junctures of the legs of the L-shape member, said pintles being disposed in said eyes by which the L-shape member has pivotal movement, one leg of the L-shape member constituting a loop jaw which cooperates with the base and the other leg constituting a manipulator connected with the U-shape member to cause pivotal movement of both of said members into a set position, and a bait holding trigger pivoted on the base, the pivotal connection of said trigger being behind the pivotal connection of said U-shape member and L-shape member, the trigger having a tail end which when engaged by the U-shape member holds the trigger in a cocked position subject to pressure on the bait end of the trigger causing the U-shape member to move the L-shape member into a sprung position wherein the jaw grippingly cooperates with the base, said eyes having eccentric portions acting as cams which raise said pintles above the longitudinal axis of the spring when the L-shape member is in the set position.

GEORGE W. OAKES.

References Cited in the file of this patent:

UNITED STATES PATENTS

| Number | Name | Date |
| --- | --- | --- |
| 1,452,087 | Mark et al. | Apr. 17, 1923 |
| 2,215,028 | Booth | Sept. 17, 1940 |
| 2,446,486 | Nickell | Aug. 3, 1948 |
| 2,590,316 | Heal | Mar. 25, 1952 |